United States Patent
Kurosawa (10) Patent No.: US 11,786,991 B2
(45) Date of Patent: Oct. 17, 2023

(54) LASER MACHINE USING FLYING BODY

(71) Applicant: FANUC CORPORATION, Yamanashi (JP)

(72) Inventor: Tadashi Kurosawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 1217 days.

(21) Appl. No.: 16/197,990

(22) Filed: Nov. 21, 2018

(65) Prior Publication Data

US 2019/0160591 A1 May 30, 2019

(30) Foreign Application Priority Data

Nov. 28, 2017 (JP) ................. 2017-227656

(51) Int. Cl.
| | |
|---|---|
| *B23K 26/08* | (2014.01) |
| *B23K 26/03* | (2006.01) |
| *B64C 39/02* | (2023.01) |
| *G06T 7/70* | (2017.01) |
| *G05D 1/00* | (2006.01) |
| *G05D 1/10* | (2006.01) |
| *G05D 1/08* | (2006.01) |
| *G02B 26/10* | (2006.01) |
| *B64U 101/00* | (2023.01) |

(52) U.S. Cl.
CPC ........ *B23K 26/0884* (2013.01); *B23K 26/032* (2013.01); *B64C 39/024* (2013.01); *G05D 1/0094* (2013.01); *G05D 1/0808* (2013.01); *G05D 1/101* (2013.01); *G06T 7/70* (2017.01); *B64U 2101/00* (2023.01); *G02B 26/101* (2013.01); *G02B 26/105* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 2009/0012639 A1 | 1/2009 | Scholich-Tessmann | |
| 2016/0271733 A1* | 9/2016 | Avitabile | B23K 26/142 |
| 2016/0340006 A1* | 11/2016 | Tang | B64C 39/024 |
| 2018/0088581 A1* | 3/2018 | Freeman | B64D 47/08 |

FOREIGN PATENT DOCUMENTS

| | | |
|---|---|---|
| CN | 104259670 A | 1/2015 |
| CN | 204930106 U | 1/2016 |
| CN | 105382423 A | 3/2016 |

(Continued)

*Primary Examiner* — Heather R Jones
(74) *Attorney, Agent, or Firm* — RatnerPrestia (57) ABSTRACT

A laser machine having less constraints on the dimension and shape of a machining object than a laser machine in the related art. The laser machine includes: a flying body capable of floating and moving in a space; a machining head mounted on the flying body and configured to radiate a laser beam; a position/posture detector configured to detect the position and posture of the machining head with respect to a workpiece; a radiation position changer capable of changing the radiation position of the laser beam radiated from the machining head on the basis of the position and posture of the machining head detected by the position/posture detector; and a laser oscillator configured to supply the laser beam to the machining head.

16 Claims, 7 Drawing Sheets

(56) References Cited

FOREIGN PATENT DOCUMENTS

| | | | | |
|---|---|---|---|---|
| CN | 105449581 A | 3/2016 | | |
| CN | 105618930 A | 6/2016 | | |
| CN | 106563880 A | 4/2017 | | |
| CN | 107138858 A | 9/2017 | | |
| CN | 107363424 A | 11/2017 | | |
| EP | 3093616 A1 * | 11/2016 | ............ | G01C 15/02 |
| JP | 2009523279 A | 6/2009 | | |
| JP | 2009-162453 A | 7/2009 | | |
| JP | 2014065047 A | 4/2014 | | |
| JP | 2014-126299 A | 7/2014 | | |
| JP | 2014-126468 A | 7/2014 | | |
| JP | 2014126299 A * | 7/2014 | | |
| JP | 2016-107843 A | 6/2016 | | |

\* cited by examiner

LASER MACHINE USING FLYING BODY

CROSS-REFERENCE TO RELATED APPLICATION

This application is a new U.S. Patent Application that claims benefit of Japanese Patent Application No. 2017-227656, filed Nov. 28, 2017, the disclosure of this application is being incorporated herein by reference in its entirety for all purposes.

BACKGROUND OF THE INVENTION

1. Field of the Invention

The present invention relates to a laser machine using a flying body, and particularly relates to a laser machine used for component machining in a production process.

2. Description of the Related Art

A system is known in which a flying body, such as a pilotless aircraft, flying without a pilot has a laser beam radiation function (e.g., see JP 2014-126299 A and JP 2014-126468 A).

In addition, a system is known that uses a pilotless aircraft, such as a helicopter, capable of staying in air as a laser beam relay device to radiate a laser beam to a target outside a visible range (e.g., see JP 2009-162453 A).

Furthermore, a device is known that uses a laser scanner mounted on a multicopter to measure a three-dimensional shape of an object from the sky (e.g., see JP 2016-107843 A).

The above-described techniques in the related art are not intended to be used for component machining in a production process and thus do not have a function to scan an irradiation position necessary for component machining with predetermined precision. A laser machine used for component machining in the related art has such a configuration that a machining head radiating a laser beam and a machining object (workpiece) move relatively, and in specific uses an orthogonal axis type machining tool, a robot, a positioner, etc., including a servo motor. Unfortunately, such a laser machine in the related art has certain constraints on the size of a workpiece capable of being subjected to laser machining and the posture of the machining head with respect to a workpiece, and laser machining outside the range of the constraints thus requires a different laser machine designed and prepared separately. On the other hand, no system in which a flying body has a laser radiation function and that can be applied to laser machining requiring relatively high precision is found in the related art.

SUMMARY OF THE INVENTION

According to one aspect of the present disclosure, a laser machine includes: a flying body capable of floating and moving in a space; a machining head mounted on the flying body and configured to radiate a laser beam; a position/posture detector configured to detect a position and a posture of the machining head with respect to a machining object; a radiation position changer capable of changing a radiation position of the laser beam radiated from the machining head on a basis of the position and the posture of the machining head detected by the position/posture detector; and a laser oscillator configured to supply the laser beam to the machining head.

BRIEF DESCRIPTION OF THE DRAWINGS

The objects, features and advantages of the invention will become more apparent from the following description of the embodiments in connection with the accompanying drawings, wherein:

FIG. 7b is a diagram illustrating an example in which the machining head changes its posture from the state in FIG. 4a;

DETAILED DESCRIPTION

Figure 1:
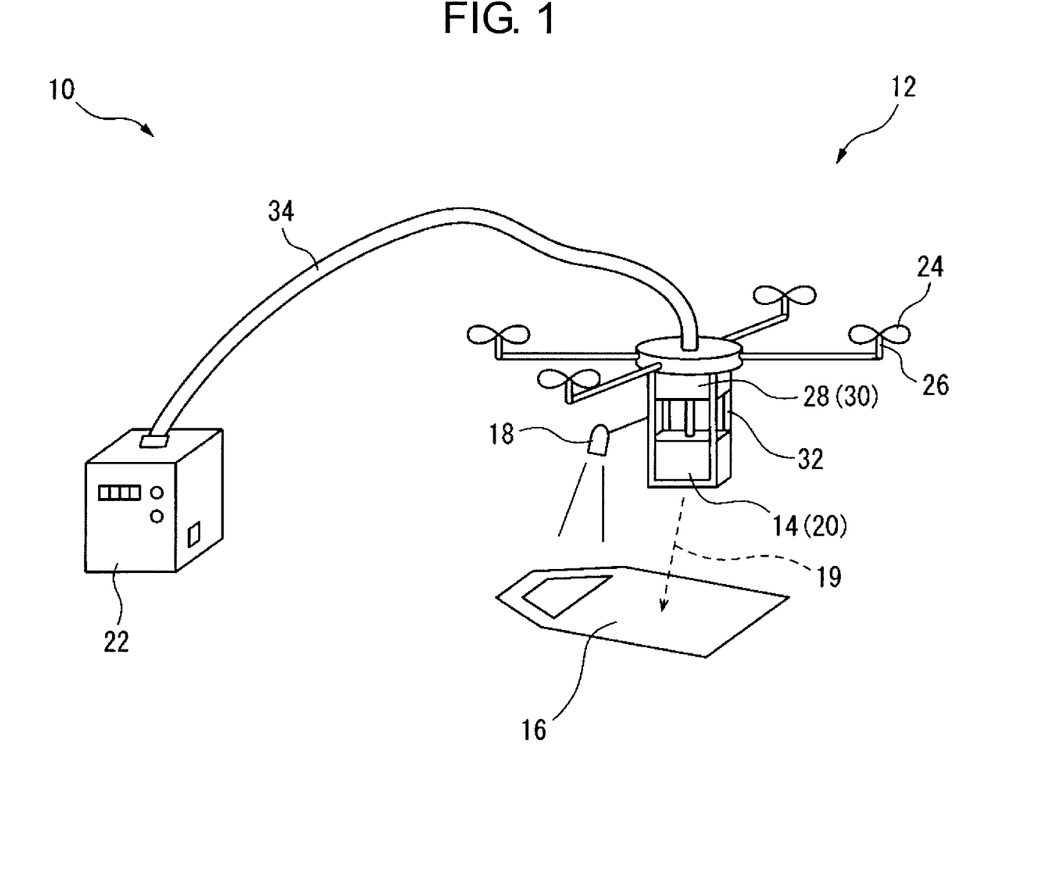
FIG. 1 is a diagram illustrating an example basic configuration of a laser machine according to one embodiment.

FIG. 1 is a diagram illustrating an example basic configuration of a laser machine 10 according to one embodiment of the present disclosure. The laser machine 10 includes a flying body 12, such as a drone and a multicopter, flown by remote control, a machining head 14 mounted on the flying body 12 and radiating a laser beam, a position/posture detector 18 detecting the position and posture (or orientation) of the machining head 14 with respect to a machining object (workpiece) 16, a radiation position changer 20 capable of changing the radiation position (radiation direction) of the laser beam 19 radiated from the machining head 14 on the basis of the position and posture of the machining head 14 detected by the position/posture detector 18, and a laser oscillator 22 supplying the laser beam to the machining head 14. Note that "laser machining" in the present specification refers to component machining using a laser typically in a production process or an inspection process in a factory, and includes machining that does not change the appearance or shape of an object to be irradiated (e.g., heat treatment, such as quenching and annealing) in addition to, for example, marking, welding, drilling, cutting, sintering, and cladding.

A typical purpose of the component machining using a laser is highly precise machining utilizing characteristics of laser beams capable of concentrating energy at a small spot, and thus predetermined precision is required in regard to a radiation position. For example, in cutting exemplified in FIG. 2a, to cut out a specified shape 17a from a workpiece 16, scanning with a laser beam 19 from the machining head 14 along the outline of the shape 17a is required. In addition, in welding exemplified in FIG. 2b, a workpiece 16 is required to be scanned with a laser beam 19 radiated from the machining head 14 accurately along a specified shape (joint) 17b being a joint of a plurality of components 16a and 16b and typically appearing as a line. In this way, the laser machine according to the present disclosure is configured not only to radiate a laser beam to the entire workpiece but also to perform scanning with a laser beam along a specified shape with predetermined precision.

The flying body 12 is a flying body capable of hovering (staying in the air without moving), for example, a multicopter, and may include, in addition to the machining head 14, a plurality of vanes 24 such as propellers, a motor 26 driving rotation of the propellers, a battery 28 supplying power to the motor, a flight controller 30 controlling flight of the flying body 12 by receiving a command from the ground (a wireless transmitter, etc., installed on the ground), a main body (frame) 32 connecting and holding these constituents, etc.; however, among these constituents, detailed description of a constituent that may be equivalent to that in the related art is omitted. Note that this is an example, and any flying body mounted with a machining head and capable of moving (flying) to a predetermined position can be used as the flying body 12. The flying body 12 preferably has a hovering function; however, this is not essential. Note that the flying body 12 in the illustrated example is configured to fly without a pilot by remote control; however, no such limitation is intended, and a controller (not illustrated), such as a processor, may be mounted on or in the flying body 12, for example.

In the illustrated example, the laser oscillator 22 is installed not in the flying body 12 but in a predetermined position, such as a floor surface in a factory, and is connected to the machining head 14 through an optical fiber 34. However, when the laser oscillator 22 is relatively small, or when the limited load weight of the flying body 12 is relatively large, the laser oscillator 22 may be mounted on or in the flying body 12, and in this case, the laser oscillator 22 is connected to a power source (not illustrated) installed on a floor surface, etc., through a power cable, etc. A power cable is generally more flexible than an optical fiber, so that by mounting the laser oscillator 22 in the flying body 12, the movable range of the flying body 12 can be expanded.

Alternatively, when a power source supplying power to the laser oscillator 22 can be reduced in size (like the battery 28), the power source may also be mounted on or in the flying body 12. In this case, by controlling the flying body 12 wirelessly, or mounting a controller in the flying body 12, no cable from the ground needs to be connected to the flying body 12, so that the movable range of the flying body 12 can be expanded significantly.

In the prior art, a technique is known in which a flying body is connected to a laser oscillator mounted on a vehicle, etc., and a laser is radiated to a stationary target in a remote position outside a visible range; however, no technique is known that uses a flying body for laser machining of a component on a production line in a factory, etc. The laser machine illustrated in FIG. 1 uses the position/posture detector 18 mounted on the flying body 12 to acquire the position and posture of the machining head 14 with respect to the workpiece 16 and can change the radiation direction of the laser beam 19 so that the laser beam 19 is radiated to a predetermined portion of the workpiece 16, thus enabling machining with precision equivalent to that of laser machining performed with a machining head mounted on a robot in the related art. In addition, the position of the machining head 14 can be measured and corrected by the position/posture detector 18 successively (at appropriate control cycles), so that even while one or both of the workpiece 16 and the flying body 12 are moving, laser machining can be performed with the predetermined precision maintained. In addition, even in a case where an actual position or posture of the workpiece 16 differs from a preliminarily set position or posture, laser machining can be performed with the predetermined precision maintained. Furthermore, the flying body 12 can enter even a complicated place where a robot, etc., cannot access, so that laser machining of the workpiece 16 can be performed at different angles.

A large number of laser machines for manufacturing and machining components in the prior art drive machining heads or workpieces with servo motors, and in specific, use orthogonal axis type machining tools, robots, positioners, etc. In such a machine, it is inefficient to unnecessarily increase the size or complexity of the machine, so that the movable range and posture of the machining head with respect to the workpiece are limited to falling within a range preliminarily designed for the dimension and shape of the workpiece. Thus, in the case of a different workpiece having a dimension or shape exceeding the preliminarily designed range, a machine needs to be designed and prepared separately. In contrast, the laser machine 10 according to the present disclosure can radiate a laser to the workpiece from a desired position in a desired posture, so that a single system (laser machine) can machine workpieces having different dimensions and shapes. In machine work (grinding, cutting, etc.), a considerable amount of machining reactive force is applied to a tool, etc., so that in a case where machining is performed with a grinding tool, etc., mounted on a flying body, the machining reactive force causes a positional deviation of the flying body and may decrease machining precision; however, in laser machining, machining reactive force is hardly applied to a machining head, so that even in a case where a machining head is mounted on a flying body, no positional deviation, etc., of the machining head due to machining reactive force occurs, enabling highly precise laser machining.

Figure 3:
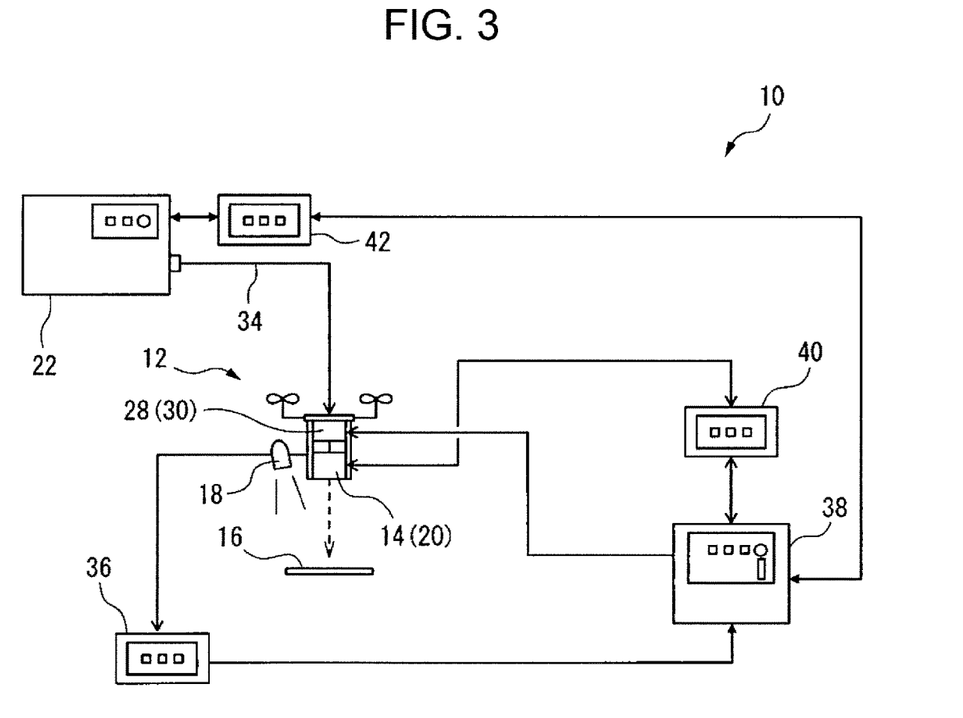
FIG. 3 is a diagram illustrating an example specific configuration of the laser machine.

FIG. 3 is a diagram illustrating an example specific configuration of the laser machine 10. A suitable specific example of the position/posture detector 18 includes an imaging device (e.g., a two-dimensional or three-dimensional camera) 18 attached to the flying body 12 and an image processor 36 receiving measurement data (image data) from the camera 18 in a wireless manner, etc., and processing an image taken by the camera 18. An image processing result from the image processor 36 is transmitted to a main controller 38 controlling flight of the flying body 12. The main controller 38 acquires the position and posture of the machining head 14 with respect to the workpiece 16 on the basis of the image processing result, and controls flight (position and posture) of the flying body 12 and transmits data of the position and posture of the machining head 14 to a scanner controller 40 on the basis of the acquired position and posture, a predetermined machining program, etc. The scanner controller 40 appropriately changes the laser radiation direction by controlling the radiation position changer 20 on the basis of the transmitted data. By detecting the position and posture by using the camera and the image processor, the position and posture of the machining head can be changed or corrected with higher precision and higher responsivity than a case using a GPS or a gyro sensor.

Figure 2A:
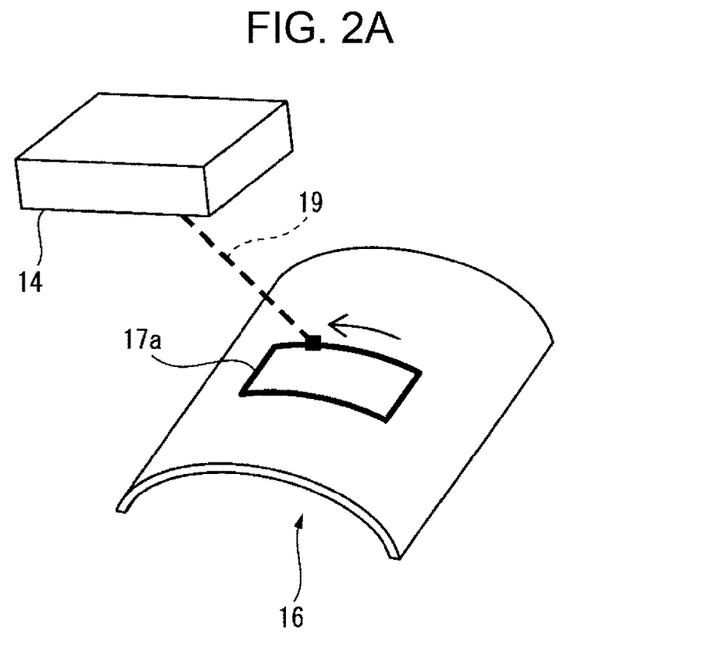
FIG. 2a is a simplified diagram illustrating cutting as one example of laser machining.
Figure 2B:
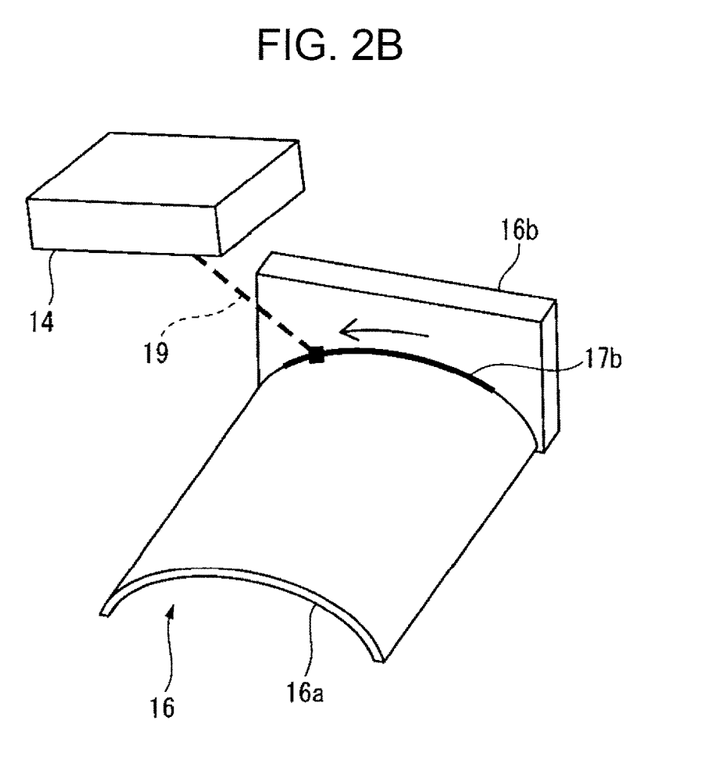
FIG. 2b is a simplified diagram illustrating welding as another example of laser machining.
Figure 4A:
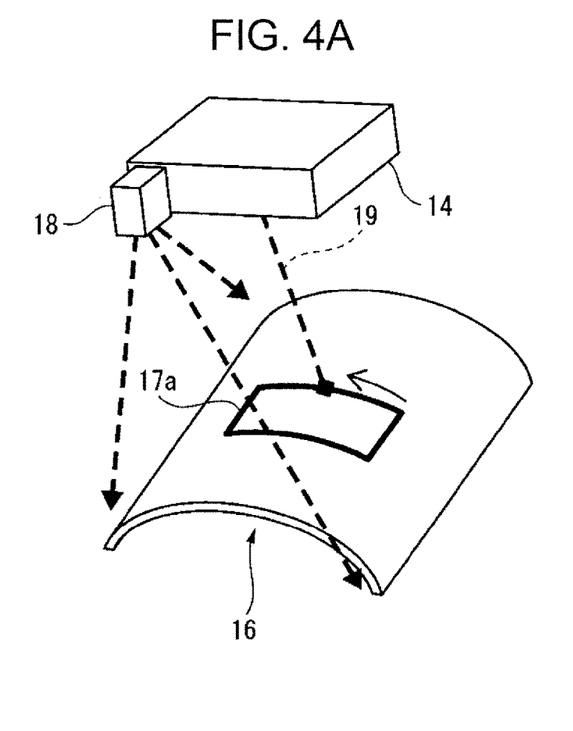
FIG. 4a is a diagram illustrating an example of measuring and correcting the position or posture of a machining head by a position/posture detector.
Figure 4B:
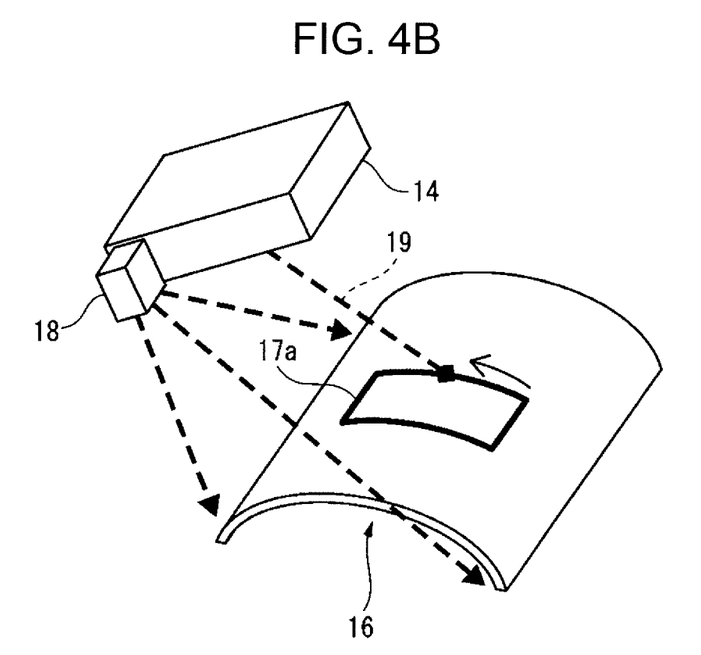
FIG. 4b is a diagram illustrating an example of measuring and correcting the position or posture of the machining head by the position/posture detector.

FIGS. 4a and 4b each illustrate an example of measurement and correction at the position/posture detector 18 in the laser machining (cutting) illustrated in FIG. 2a. The position/posture detector 18 takes an image of the workpiece 16 to detect a relative position and posture of the machining head 14 with respect to the workpiece 16 with the predetermined precision. The main controller 38 or the scanner controller 40 corrects the radiation position of the laser beam 19 by using information acquired through the detection to achieve component machining in which scanning with the laser beam is performed with the predetermined precision maintained. Note that the position or posture of the machining head 14 with respect to the workpiece 16 is different between in FIG. 4a and in FIG. 4b; however, through measurement and correction at the position/posture detector (camera) 18, the laser beam can be radiated to the specified shape 17a of the workpiece 16 with the predetermined precision in both cases.

The main controller 38 can transmit a command relating to laser radiation to a laser controller 42 controlling the laser oscillator 22, on the basis of the machining program, etc. In specific, the command from the main controller 38 to the laser controller 42 may include power, a frequency, and duty that are laser radiation conditions. Alternatively, with a plurality of radiation conditions preliminarily stored in a memory, etc., in the laser controller 42, the command from the main controller 38 may include an instruction about which of the radiation conditions in the memory is to be used and an instruction about timing of starting and ending radiation.

The laser oscillator 22 of the present embodiment is a laser beam source supplying a laser beam to the machining head 14, and examples of types of a laser oscillated by the laser oscillator 22 include a fiber laser, a CO2 laser, and a YAG laser; however, another type of a laser may be used. By exchanging commands between the above-described controllers at appropriate control cycles, laser machining can be performed with precision sufficient for practical use. Note that in FIG. 3, the image processor 36, the main controller 38, the scanner controller 40, and the laser controller 42 are each illustrated as a separate arithmetic processing device (processor), etc.; however, some of these may be combined to be substantially a single device. For example, the scanner controller 40 (the function thereof) may be incorporated in the main controller 38. Alternatively, at least one of these controllers may be mounted on or in the flying body 12.

Figure 5:
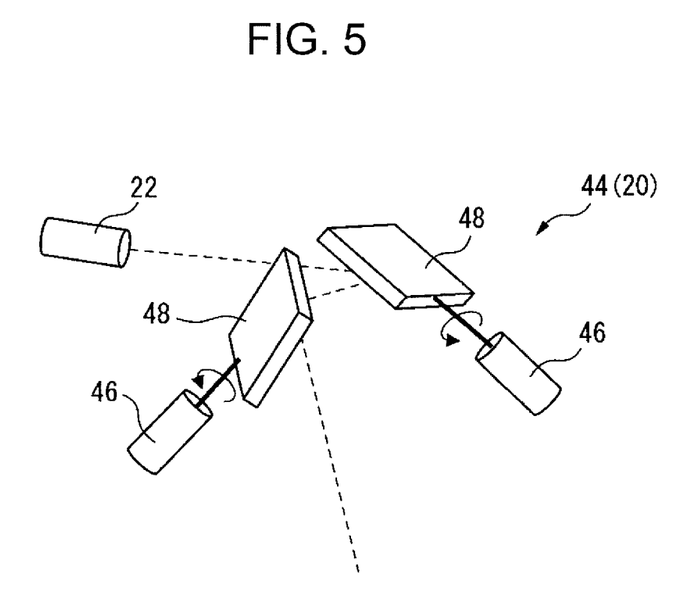
FIG. 5 is a diagram illustrating an example galvano mechanism.

FIG. 5 is a diagram illustrating an example in which the machining head 14 is a laser scanner and includes a galvano scanner as the radiation position changer 20. In specific, in the machining head 14, a galvano mechanism 44 capable of changing the radiation direction of the laser beam into a desired direction is incorporated as a laser radiation position changeable mechanism, and the galvano mechanism 44 includes at least one pair (two pairs in the illustrated example) of a galvano motor 46 and a mirror 48. To be more specific, the mirror 48 reflecting the laser beam is attached to a tip part of each of the galvano motors 46, and by adjusting the rotation angle of the galvano motor 46, the reflection angle of the laser beam entering from the laser oscillator 22 can be changed into a desired angle. As in the illustrated example, by using the two pairs of the galvano motors 46 and the mirrors 48, the laser radiation position on a plane can be adjusted to be a desired position.

The galvano mechanism is driven by voltage control and can thus operate with significantly high responsivity. Accordingly, without changing the position of the flying body 12 or the direction of the machining head 14, the laser radiation direction can be changed quickly, and laser machining such as contour machining can be performed with high precision. However, the radiation direction changer is not limited to the galvano mechanism, and, for example, a resonant scanner or a lens mechanism capable of changing the focal distance of a laser beam into a desire distance may be used. The machining head 14 may be provided with an additional shaft, and one or both of the position and posture of the machining head 14 may be changed to change one or both of the radiation position and the radiation direction.

Figure 6:
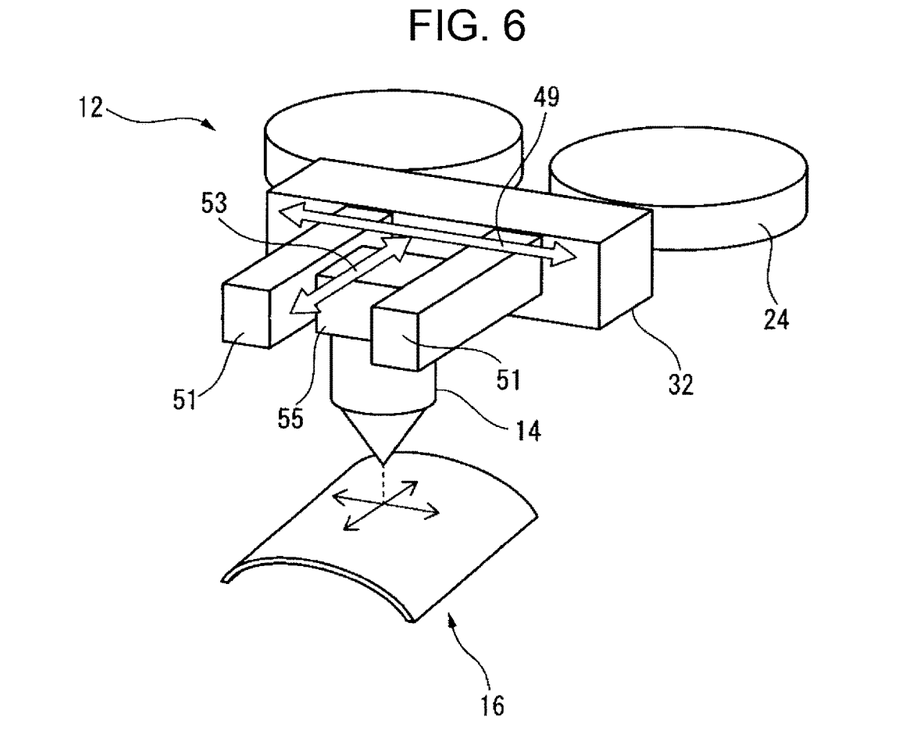
FIG. 6 is a diagram illustrating an example configuration of an additional shaft changing the position or posture of the machining head.

FIG. 6 illustrates an example configuration enabling scanning and change of the radiation position of the laser beam by using an additional shaft. The flying body 12 includes a first additional shaft 51 attached to the main body (frame) 32 so as to move in a first direction 49 and a second additional shaft 55 attached to the first additional shaft 51 so as to move in a second direction 53 differing from the first direction 49 (preferably orthogonal to the first direction), and the machining head 14 is attached to the second additional shaft 55. By using at least one (preferably two or more) additional shaft in this way, the machining head is configured to be movable with respect to the main body of the flying body within a predetermined range, enabling scanning of the laser radiation position for component machining and correction based on information from the position/posture detector.

Figure 7A:
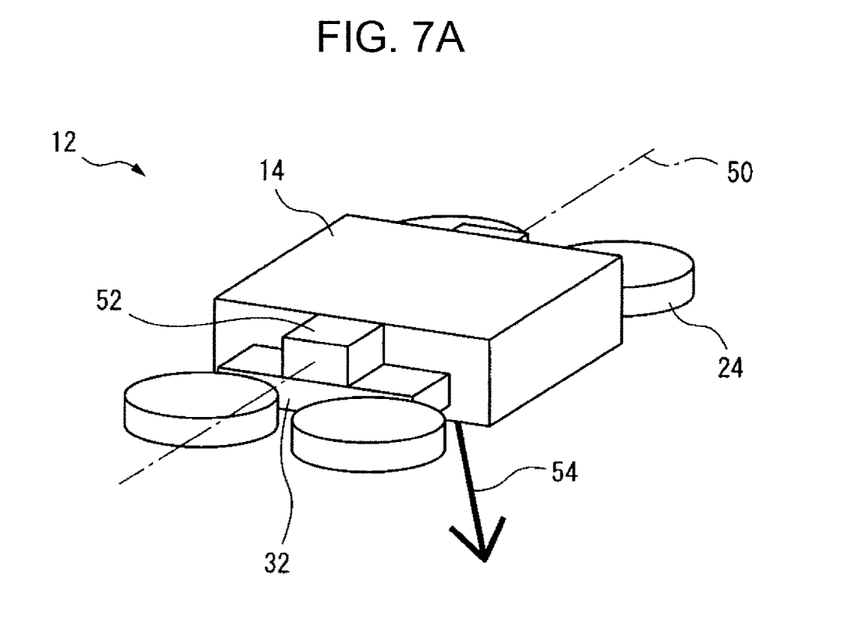
FIG. 7a is a diagram illustrating an example posture change mechanism for the machining head.
Figure 7B:
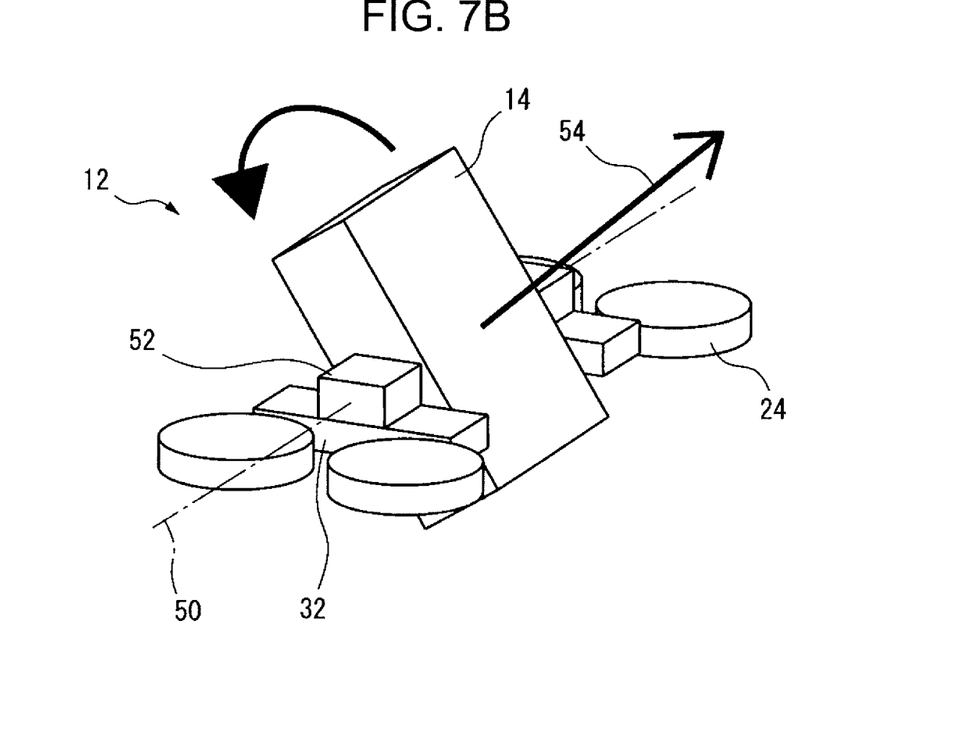

FIG. 7a and FIG. 7b are diagrams for describing a posture change mechanism changing the posture of the machining head 14 with respect to the main body (frame 32, etc.) of the flying body 12. When the machining head 14 is a laser scanner or has an additional shaft, the laser radiation direction can be changed within a certain range without changing the position or posture of the flying body 12; however, in a case where a significant change of the laser radiation direction (e.g., a change of the vertical direction component of the radiation direction from a downward direction into an upward direction) is desired, it may be difficult to achieve that change with the variable range of the scanner. For example, in a case where the flying body 12 is a multicopter, the flying body 12 cannot be maintained in an upside-down posture.

Thus, for example, as illustrated in FIG. 7a, a drive mechanism 52 driving rotation of the machining head 14 with respect to the main body 32 about an axis line 50 extending in a substantially horizontal direction can be provided as a posture change mechanism. For example, as illustrated in FIG. 7b, the machining head 14 is rotated about the axis line 50 by 90 degrees or greater by using the posture change mechanism 52, enabling the laser radiation direction 54 to change its vertical direction component from a downward direction into an upward direction, and in the case of 180-degree rotation, for example, the radiation direction can be reversed completely. By using this posture change mechanism 52, the laser radiation direction can be set to be any direction without changing the posture of the flying body 12, and the degree of freedom of laser machining is significantly improved.

Figure 8:
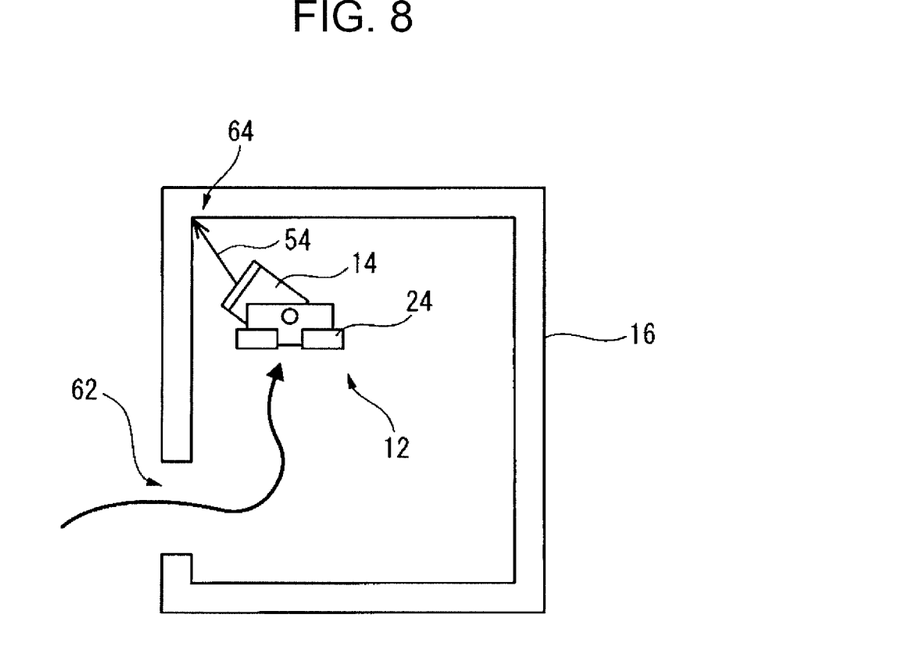
FIG. 8 is a diagram illustrating an example in which a flying body enters a complicated place and performs laser machining.

FIG. 8 illustrates an example in which the flying body 12 can machine a complicated portion at different angles. When a general-purpose machine tool or robot is used, it is difficult to perform machining, entering deep inside a workpiece, and, for implementation, the length of an arm and the angle for holding a machining head are required to be designed and set individually for each case of machining. However, in the example in FIG. 8, even in a case where a workpiece 16 has a complicated shape, the flying body 12 can approach a predetermined portion 64 to be machined by forming, in the workpiece 16, an opening 62 allowing the flying body 12 to enter, and the radiation direction 54 of the laser from the machining head 14 can be changed appropriately by using the above-described radiation position changer or posture change mechanism to perform desired laser machining. Accordingly, the use of the flying body 12 eliminates the need for preliminary design and setting of the machine.

Figure 9:
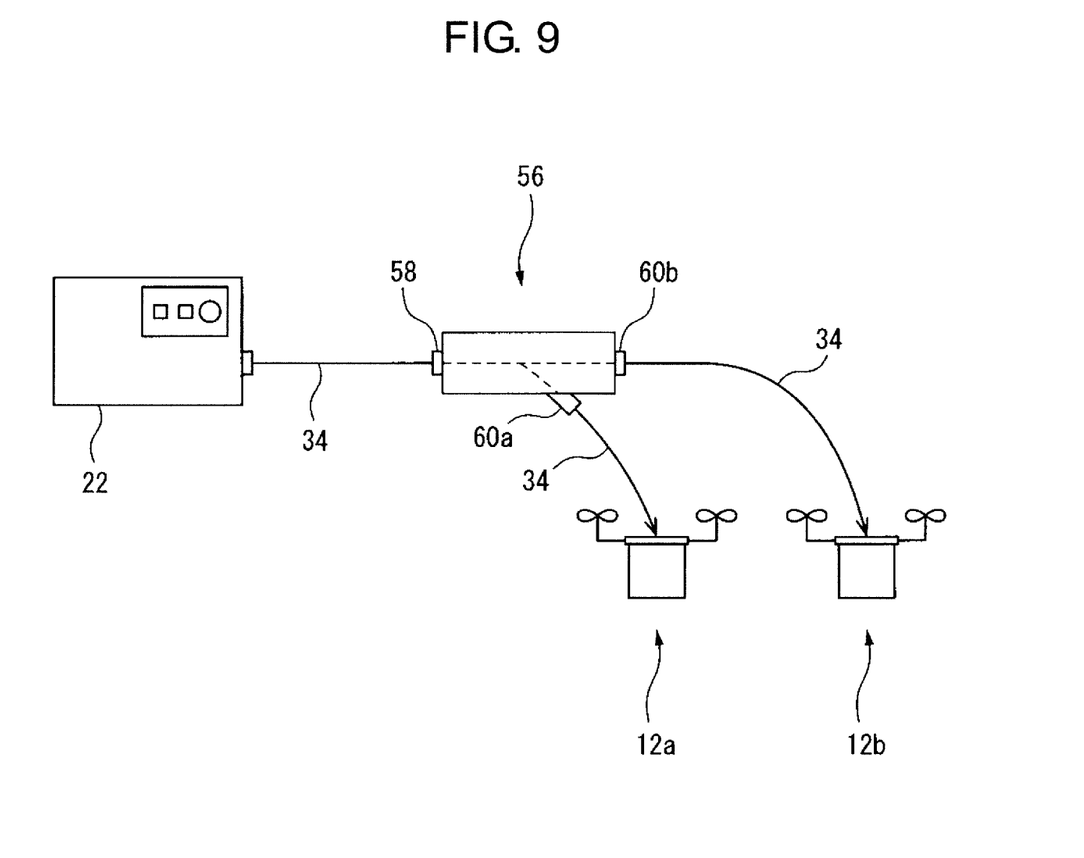
FIG. 9 is a diagram illustrating an example fiber switcher.

FIG. 9 illustrates an example in which, when a plurality of flying bodies and a laser oscillator are connected through an optical fiber, the optical fiber is provided with a fiber switcher (beam switcher). For example, when a laser beam is supplied from a single laser oscillator 22 to two flying bodies 12a and 12b by using an optical fiber 34, the optical fiber 34 is provided with a fiber switcher 56 to configure a machining system having higher operation efficiency or a machining system enabling a wider range of machining methods.

For example, in a case where the fiber switcher 56 is of such a type that a laser beam from the laser oscillator 22 is supplied to only either one of the flying bodies in a time sharing manner (so-called a time sharing type), while laser machining is performed by using the flying body 12a, the flying body 12b moves (flies) to a place for subsequent laser machining and is kept on standby, so that immediately after completion of the machining with the flying body 12a, machining with the flying body 12b in the standby state can start, resulting in shortening of the entire cycle time.

Alternatively, in a case where the fiber switcher 56 is of such a type that a laser beam from the laser oscillator 22 is supplied to both of the flying bodies at a predetermined ratio (so-called a power sharing type), the two flying bodies enable, in addition to simultaneous laser machining of different types, simultaneous laser radiation to the same workpiece in different directions, which achieves, in addition to shortening of the cycle time, laser machining that cannot be performed with a single machining head, for example, simultaneous laser radiation to both surfaces of a workpiece.

Note that the fiber switcher 56 in the illustrated example includes one input port 58 connected to the laser oscillator 22 and two output ports 60a and 60b connected to the respective flying bodies 12a and 12b; however, a fiber switcher including three or more output ports may of course be used to enable simultaneous operation of three or more flying bodies.

According to an aspect of the present disclosure, a laser machine is provided that can use a laser radiated from a flying body to perform machining through scanning with a laser beam with predetermined precision and that has less constraints on the dimension and shape of a machining object than a laser machine in the related art.

While the invention has been described with reference to specific embodiments, it will be understood, by those skilled in the art, that various changes or modifications may be made thereto without departing from the scope of the following claims.

The invention claimed is:

1. A laser machine comprising:
a flying body configured to float and move in a space;
a machining head mounted on the flying body and configured to radiate a laser beam;
a position/posture detector configured to detect a position and a posture of the machining head with respect to a machining object;
a radiation position changer configured to change a radiation position of a laser beam radiated from the machining head on a basis of the position and the posture of the machining head detected by the position/posture detector, in order to maintain irradiation of the laser beam along a predetermined outline of a joint between a plurality of machining objects even when at least one of the position and the posture of the flying body varies; and
a laser oscillator configured to supply the laser beam to the machining head,
wherein the radiation position changer includes a posture change mechanism comprising a drive mechanism configured to rotate the machining head relative to a main body of the flying body about an axis extending in a generally horizontal direction orthogonal to an axis of the flying body.

2. The laser machine of claim 1, wherein the position/posture detector includes an imaging device mounted on the flying body and an image processor configured to process an image taken by the imaging device.

3. The laser machine of claim 1, wherein the machining head includes a laser scanner.

4. The laser machine of claim 3, wherein the laser scanner includes a galvano mechanism including a plurality of mirrors.

5. The laser machine of claim 1, wherein the radiation position changer is composed of at least one additional shaft attached to the machining head.

6. The laser machine of claim 1, wherein the posture change mechanism is configured to change the posture of the machining head with respect to the main body of the flying body.

7. The laser machine of claim 1, wherein the laser oscillator is connected to the machining head through an optical fiber.

8. The laser machine of claim 7, wherein the laser machine includes a plurality of the flying bodies, and the optical fiber is provided with a fiber switcher.

9. The laser machine of claim 1, wherein the laser oscillator is mounted on or in the flying body.

10. The laser machine of claim 9, wherein a power source configured to supply power to the laser oscillator is mounted on or in the flying body.

11. The laser machine of claim 1, wherein the plurality of machining objects have different dimensions and shapes.

12. The laser machine of claim 1, wherein the posture change mechanism is configured to change the posture of the machining head with respect to the main body of the flying body.

13. The laser machine of claim 1, wherein the posture change mechanism rotates the machining head about the axis extending in the generally horizontal direction by 90 degrees or greater.

14. A laser machine comprising:
a flying body configured to float and move in a space;
a machining head mounted on the flying body and configured to radiate a laser beam;
a position/posture detector configured to detect a position and a posture of the machining head with respect to a machining object;
radiation position changer configured to change a radiation position of a laser beam radiated from the machining head on a basis of the position and the posture of the machining head on a basis of the position and the posture of the machining head detected by the position/posture detector, the radiation position changer including a posture change mechanism configured to change the posture of the machining head with respect to a main body of the flying body, and a laser scanner configured to change a radiation direction of the laser beam along a predetermined outline of a joint between a plurality of machining objects; and a laser oscillator configured to supply the laser beam to the machining head, wherein the posture change mechanism has a drive mechanism configured to rotate the machining head relative to the main body of the flying body about an axis extending in a generally horizontal direction orthogonal to an axis of the flying body.

15. The laser machine of claim 14, wherein the plurality of machining objects have different dimensions and shapes.

16. The laser machine of claim 14, wherein the drive mechanism rotates the machining head about the axis extending in a generally horizontal direction by 90 degrees or greater.

* * * * *